Oct. 6, 1942.    W. C. COOPER, JR., ET AL    2,298,091
SOLUTION OF VANADIUM FROM VANADIUM OXIDE MIXTURES
Filed March 11, 1941
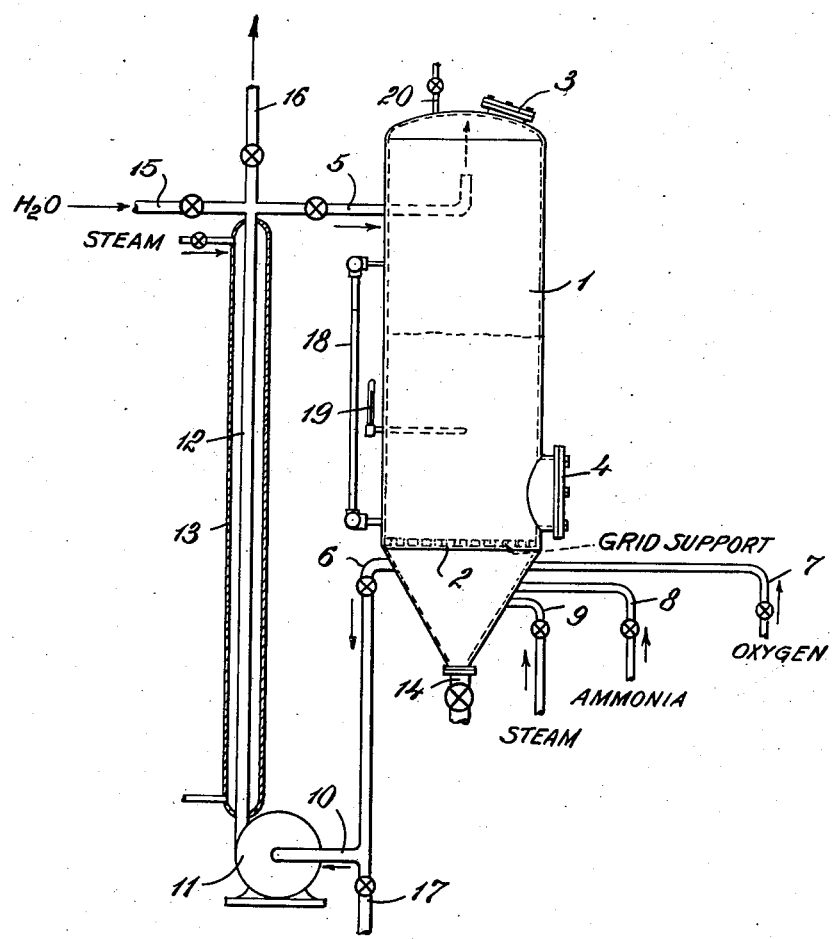
INVENTORS
William C. Cooper, Jr.
BY & Alver Dunbar.
ATTORNEY Patented Oct. 6, 1942

2,298,091

UNITED STATES PATENT OFFICE 2,298,091

SOLUTION OF VANADIUM FROM VANADIUM OXIDE MIXTURES

William Charles Cooper, Jr., Jenkintown, Pa., and Alver Dunbar, Baltimore, Md., assignors, by mesne assignments, to Allied Chemical & Dye Corporation, a corporation of New York Application March 11, 1941, Serial No. 382,812

16 Claims. (Cl. 23—51)

This invention relates to the recovery of vanadium from vanadium oxide mixtures and especially to the reworking of used vanadium catalysts, such as employed for the manufacture of dicarboxylic acid anhydrides by vapor phase oxidation of hydrocarbons and oxygen derivatives of an intermediate stage of oxidation.

The use of vanadium oxide catalysts for the catalysis of oxidation reactions, e. g. vapor phase oxidation of naphthalene to form phthalic anhydride, is well known. One method of preparing such catalysts involves preparing an ammonium metavanadate solution, coating or impregnating particles of a carrier with the solution, evaporating the resultant mass to dryness, thereby producing a coating of the metavanadate on the carrier, and then heating the carrier in a stream of oxidizing gas to convert the ammonium metavanadate to catalytically active vanadium oxide. Another method involves acidifying filtered ammonium metavanadate solution to precipitate the vanadium content of the solution, mixing the precipitate with hydrochloric acid, coating carrier particles with the resultant mixture and roasting the coated particles to convert the coating to catalytically active vanadium oxide.

The catalysts prepared by the methods described above gradually lose activity during conduct of the oxidation reaction. This loss of activity, which proceeds slowly over a period of many months, may be due in part to contamination of the catalyst mass with small amounts of combustion-promoting materials, such as iron oxides, or to a reduction in surface area or change in the physical structure of the catalyst mass caused by local microscopic or macroscopic flow, or by coating of the catalyst with non-catalytic or anticatalytic materials.

It is the customary procedure in oxidizing operations of the class referred to above to employ a vanadium oxide catalyst mass until its activity diminishes to a point such that further use is no longer economically feasible, and thereupon to substitute a freshly prepared catalyst mass. The so-called "spent" catalyst may be reworked or discarded.

Treatments for rejuvenation of the catalyst en masse have not proved satisfactory.

Removal of vanadium from the catalyst support requires solution of the vanadium compounds present in a solvent such as ammonium hydroxide. However, at least a part of the vanadium is present in a relatively insoluble form. Hence difficulty is experienced in effecting a complete recovery of vanadium values from the catalyst mass.

It is an object of the present invention to provide an effective method of removing the vanadium values from used vanadium catalyst masses more completely than hitherto and with inexpensive reagents which are harmless to ordinary steel equipment and hence do not require special corrosion-resistant equipment for the recovery process.

Commercial vanadium oxide is an economical starting material for the production of vanadium oxide catalysts but contains substantial amounts of impurities such as compounds of iron, silicon, aluminum, sulfur, sodium, etc. An analysis of such a product may indicate, for example, about 85% $V_2O_5$, 6% $Na_2O$, ½% $SiO_2$, ¼% $Fe_2O_3$. The commercial vanadium oxide is difficultly and incompletely soluble in aqueous ammonia, so that production of ammonium metavanadate solution therefrom is a slow and tedious process and results in substantial loss of vanadium oxide owing to failure of the vanadium oxide to dissolve completely in the ammonia. Treatment of commercial vanadium oxide with aqueous ammonia results in ammonium vanadate solutions which are difficult to filter owing largely to the presence of colloidal material in the solution, and the filtrate frequently contains objectionable amounts of impurities which deleteriously affect catalyst activity, for example between 0.001% and 0.01% of iron calculated as $Fe_2O_3$ based on the $V_2O_5$ content of the filtrate. Acidification of the filtrate with nitric acid in many cases results in a difficultly filterable colloidal precipitate rather than the more desirable easily filterable crystalline precipitate.

A further object of this invention is to provide an improved vanadium recovery process suitable for recovery of a substantially larger proportion of the vanadium from commercial or technical grade vanadium oxide to produce ammonium vanadate solutions free from objectionable proportions of impurities.

In accordance with the process of the present invention vanadium oxide mixtures, such as the technical grade or the oxide present in used catalyst masses is heated with an aqueous ammoniacal solution and simultaneously treated with molecular oxygen.

The oxygen treatment of the present invention serves not only to convert the less soluble vanadium oxides to readily soluble form but also to convert lower oxides of impurities such as iron to higher oxides more easily and completely removed by filtration.

A suitable method of effecting the treatment comprises charging the impure vanadium oxide into a tank provided with means for introducing oxygen and means for circulating ammoniacal solution through the material at elevated pressure and temperature.

Preferably the treatment is conducted at temperatures between about 100° C. and about 200° C. and at pressures between about 40 pounds per square inch absolute and about 250 pounds per square inch absolute with an oxygen pressure between about 10 pounds per square inch and about 230 pounds per square inch. Sufficient ammonia should be present to provide an excess over the stoichiometric requirements for converting vanadium, as $V_2O_5$, to ammonium metavanadate.

Oxygen may be introduced into the solution in any suitable manner. A convenient method involves circulating the solution through an atmosphere of oxygen and through the vanadium oxide progressively. Intimate contact of oxygen with the solution may be effected by spraying the solution into an atmosphere of oxygen, ammonia, and steam or by allowing the solution to flow over surfaces exposed to such an atmosphere. Such surfaces may be in a zone apart from the vanadium oxide mixture or the particles of the mixture may serve as the contact surfaces.

The oxygen may be employed as an oxygen concentrate or as air. It is preferred to employ the more concentrated form of oxygen since the diluting effect of atmospheric nitrogen reduces the rate at which the reaction takes place at a given temperature and pressure and accordingly requires either a corresponding increase in total reaction pressure or an increased period for effecting the solution of vanadium.

The attached drawing illustrates a form of apparatus which may be employed for the process of the invention.

This apparatus comprises a carbon steel treating vessel 1 provided with a supporting grid 2. The vessel has a charging hole 3 and discharging hole 4, each provided with a suitable cover, a solution inlet 5 and outlet 6, an oxygen inlet 7, an ammonia inlet 8, and a steam inlet 9. While inlets 7 and 8 are shown disposed beneath the supporting grid 2, their location is relatively unimportant as long as they are not obstructed by solid material. Outlet 6 is connected by a line 10 to circulating pump 11, which is connected by a line 12, having a steam jacket 13, with inlet 5. The lower part of vessel 1 serves as a trap for permitting solid material to separate from fluid being recirculated. Drain pipe 14 is provided for removing such solid material. An additional inlet 15 for water and outlets 16 and 17 for solution may be provided as shown. The treating tank 1 may be provided with a water level gauge 18, thermometer 19, vent 20, and the usual safety devices for pressure equipment such as automatic pressure release valves, etc. (not shown). Each of pipes 5 to 9, and 14 to 17 is provided with a suitable shut off valve. The grid 2 may carry a screen for preventing passage of relatively fine particles of material.

Inlet 5, as illustrated, is turned up within tank 1 so as to direct liquid flowing into the tank upwardly against the top of the tank thereby distributing the material as a film over the surfaces of the tank and as spray in the vapor space thereof. If desired, the end of this outlet may be provided with a nozzle to increase the liquid velocity and thus cooperate with the dome of vessel 1 to provide a jet and plate type of atomization. In place of a pump 11, a steam jet or other circulating device may be employed.

In operation of the apparatus illustrated for recovery of vanadium values from spent catalyst comprising vanadium oxide coated on aluminum oxide, e. g. "Alundum," the procedure may be as follows:

About 400 pounds of the spent catalyst (¾" lumps down to 4 mesh "Alundum," for example) is charged to tank 1 and the charging opening 3 is closed. About 20 gallons of hot water are introduced through inlets 15 and 5, circulated for a few minutes, and drained out at 17. The purpose of this preliminary wash is to remove $V_2O_5$ dust. The valves on outlets 6 and 17 are then closed and live steam is introduced through inlet 9 to heat the catalyst to a temperature of about 100° C. During this period vent 20 is open. The vent is then closed and vessel 1 is filled with water to a level slightly above the catalyst level in the tank. The charge is heated to about 110° C. by blowing it with live steam and about 4 pounds of commercial anhydrous ammonia are added through inlet 8, and about 1 to 1½ pounds of oxygen (99%–100% $O_2$) are added through inlet 7, providing an oxygen partial pressure of about 30 pounds per square inch absolute at 110° C. The valves on lines 5 and 6 are opened and circulating pump 11 is started to cause solution to flow from the bottom of the tank up through steam-jacketed conduit 12 to the top of the tank where the liquid impinges upon the dome of the tank and is distributed into contact with the atmosphere of ammonia, oxygen, and water vapor above the catalyst mass. The circulation is continued until the digestion temperature reaches about 120° to 140° C. for example. When the selected digestion temperature is attained, the supply of steam to jacket 13 is cut off and circulation is continued for about 20 minutes. The solution is thereupon removed from the tank, either by blowing the solution out through lines 6 and 17 or by pumping it through lines 6, 10, 12 and 16. This solution is stored for further treatment. The valve on outlet pipe 6 is then closed and water is introduced into the tank and circulated for about 10 minutes, steam being supplied to jacket 13 during this treatment. This wash water is then passed to storage along with the ammoniacal solution previously discharged. The tank is again charged with water heated to about 110° C., an additional 4 pounds of ammonia and 1 to 1½ pounds of oxygen are introduced, and the solution is circulated for 20 minutes at about 120° to 140° C. as in the first ammoniacal treatment. After this period the ammoniacal solution is discharged as before and the catalyst mass is washed again with hot water. Normally about four such successive ammoniacal treatments in the presence of oxygen serve to remove substantially all of the vanadium oxide present in the catalyst mass.

The number of treatments desirable in any particular case may be determined by examining the catalyst for the presence of black patches. If black patches are present to any substantial extent an additional treatment should be given until the mass is substantially free from such patches.

After the final ammoniacal treatment, two successive water washings are employed similar to the intermediate water washings. The collected liquor from the four ammoniacal treatments and the four water washes is heated to expel ammonia and then filtered with the assistance of a filter aid, such as macerated filter paper, to remove water-insoluble impurities, for example iron, which is present as a relatively filterable precipitate of ferric hydroxide.

The resulting aqueous solution of ammonium metavanadate may be acidified to precipitate vanadic acid and further worked up for the manufacture of fresh catalyst. There remains in tank 1 a charge of decoated "Alundum" particles which may be removed through discharge outlet 4 and used again for the preparation of additional catalyst.

An alternative operating schedule involves charging about 450 pounds of used catalyst to tank 1, washing it preliminarily with 25 gallons of water and then with 3 to 6 20-gallon portions of ammoniacal oxygen solution, enough to flood about half the catalyst, at about 50 pounds gauge pressure and 130° C. for two hours each, and finally washing the mass with two water washes of 20 gallons each. The ammoniacal solutions are obtained by introducing about 20 gallons of water, and about 0.16 pound of ammonia and about 0.02 pound of oxygen per gallon of water to the tank.

In the treatment of finely divided material down through which ammoniacal solution can percolate only with difficulty, the material to be treated may be charged to a horizontal tank having a perforated steam inlet along its bottom so that agitation of the mass may be secured by introducing steam. If desired, oxygen and ammonia may be introduced in a similar manner continuously or intermittently during the treatment period. This system is especially suitable for the treatment of technical grade vanadium oxide to prepare ammonium metavanadate solutions therefrom.

Instead of circulating or agitating the solution as described above, a conventional Soxhlet type of extraction apparatus may be employed; particularly in the treatment of lump material such as used vanadium oxide catalysts or insoluble carriers.

While the rate of solution increases with an increase of temperature and pressure, pressures about about 250 pounds per square inch require special pressure equipment.

We claim:

1. The method of dissolving vanadium from a vanadium oxide mixture, which comprises introducing oxygen into a hot aqueous ammoniacal solution and contacting the vanadium oxide mixture with the hot aqueous oxygen-containing ammoniacal solution.

2. The method of preparing an ammonium metavanadate substantially free from silica and iron oxides from a vanadium oxide mixture containing such an impurity, which comprises introducing oxygen into a hot aqueous ammoniacal solution and contacting the vanadium oxide mixture with the hot aqueous oxygen-containing ammoniacal solution thereby forming an aqueous ammoniacal solution of ammonium metavanadate, expelling ammonia from said solution, and filtering the resulting ammonium metavanadate solution to separate undissolved impurities.

3. The method of dissolving vanadium from a vanadium oxide mixture, which comprises subjecting the vanadium oxide mixture to an extraction at a temperature between 100° C. and 200° C. with an aqueous ammoniacal solution in the presence of oxygen at an absolute pressure between 40 and 250 pounds per square inch and an absolute oxygen pressure of at least 10 pounds per square inch.

4. The method of preparing an ammonium metavanadate substantially free from silica and iron oxides from a vanadium oxide mixture containing such an impurity, which comprises subjecting the vanadium oxide mixture to an extraction at a temperature between 100° C. and 200° C. with an aqueous ammoniacal solution in the presence of oxygen at an absolute pressure between 40 and 250 pounds per square inch and an absolute oxygen pressure of at least 10 pounds per square inch, thereby forming an aqueous ammoniacal solution of ammonium metavanadate, vaporizing ammonia from said solution, and filtering the resulting ammonium metavanadate solution to separate undissolved impurities.

5. The method of dissolving vanadium from a vanadium oxide mixture, which comprises bringing water at a temperature between 100° C. and 200° C. into intimate contact with an atmosphere containing ammonia and oxygen at an absolute pressure between 40 and 250 pounds per square inch and bringing the resulting ammoniacal solution of oxygen into contact with the vanadium oxide mixture.

6. The method of dissolving vanadium from a vanadium oxide mixture, which comprises bringing water at a temperature between 100° C. and 200° C. into intimate contact with an atmosphere containing ammonia and oxygen at an absolute pressure between 40 and 250 pounds per square inch and an oxygen pressure between 10 and 230 pounds per square inch, and bringing the resulting ammoniacal solution of oxygen into contact with the vanadium oxide mixture.

7. The method of dissolving vanadium from a vanadium oxide mixture, which comprises bringing an aqueous ammoniacal solution at a temperature between 100° C. and 200° C. into intimate contact with an atmosphere essentially composed of oxygen, and water vapor containing ammonia at an absolute pressure between 40 and 250 pounds per square inch and bringing the resulting ammoniacal solution of oxygen into contact with the vanadium oxide mixture.

8. The method of dissolving vanadium from a vanadium oxide mixture, which comprises bringing an aqueous ammoniacal solution at a temperature between 100° C. and 200° C. into intimate contact with an atmosphere essentially composed of oxygen and water vapor containing ammonia, at an absolute pressure between 40 and 250 pounds per square inch and an oxygen pressure between 10 and 230 pounds per square inch, and bringing the resulting ammoniacal solution of oxygen into contact with the vanadium oxide mixture.

9. The method of dissolving vanadium from a vanadium oxide mixture, which comprises circulating water in a closed system comprising a gas liquid contact zone wherein the water is intimately contacted with ammonia vapor and oxygen, and a liquid solid contact zone wherein the resulting ammoniacal oxygen solution is contacted with the vanadium oxide mixture, and maintaining said water at a temperature between 100° C. and 200° C. and at an absolute pressure between 40 and 250 pounds per square inch throughout said system.

10. The method of extracting vanadium from a used catalyst comprising vanadium oxide, which comprises subjecting the catalyst to an extraction at a temperature between 100° C. and 200°

C. with an aqueous ammoniacal solution in the presence of oxygen at an absolute oxygen pressure between 10 and 230 pounds per square inch.

11. The method of extracting vanadium from a used catalyst comprising vanadium oxides deposited on a granular aluminum oxide carrier which comprises circulating water in a closed system comprising a gas liquid contact zone wherein the water is intimately contacted with ammonia vapor and oxygen, and a liquid solid contact zone wherein the resulting ammoniacal oxygen solution is contacted with the catalyst, and maintaining said water at a temperature between 100° C. and 200° C. and at an absolute pressure between 40 and 250 pounds per square inch throughout said system.

12. The method of extracting vanadium from a used catalyst comprising vanadium oxides deposited on a granular aluminum oxide carrier which comprises circulating water in a closed system comprising a gas liquid contact zone wherein the water is intimately contacted with ammonia vapor and oxygen, and a liquid solid contact zone wherein the resulting ammoniacal oxygen solution is contacted with the catalyst, and maintaining said water at a temperature of at least 100° C. and at an absolute pressure at least 40 pounds per square inch throughout said system.

13. The method of extracting vanadium from a used catalyst comprising vanadium oxides, which comprises subjecting the catalyst to an extraction at a temperature between 100° C. and 200° C. with an aqueous ammoniacal solution in the presence of oxygen under an absolute oxygen pressure between 10 and 230 pounds per square inch thereby forming an aqueous ammoniacal solution of ammonium metavanadate, expelling ammonia from said solution, filtering the resulting ammonium metavanadate solution to separate undissolved impurities, and utilizing the solution thus purified for preparation of fresh vanadium oxide catalyst.

14. The method of extracting vanadium from a used catalyst comprising vanadium oxides deposited on a granular carrier, which comprises circulating water in a closed system comprising a gas liquid contact zone wherein the water is intimately contacted with an atmosphere essentially consisting of steam and oxygen at an oxygen pressure between 10 and 230 pounds per square inch, containing ammonia vapor, and a liquid solid contact zone wherein the resulting ammoniacal oxygen solution is contacted with the catalyst, and maintaining said water at a temperature between 100° C. and 200° C. and at an absolute pressure between 40 and 250 pounds per square inch throughout said system thereby forming an aqueous ammoniacal solution of ammonium metavanadate, expelling ammonia from said solution, and utilizing the solution thus purified for preparation of fresh vanadium oxide catalyst.

15. The method of extracting vanadium from a used catalyst comprising vanadium oxides deposited on a granular aluminum oxide carrier, which comprises circulating water in a closed system comprising a gas liquid contact zone wherein the water is intimately contacted with an atmosphere essentially consisting of steam and oxygen at an oxygen pressure between 10 and 230 pounds per square inch, containing ammonia vapor, and a liquid solid contact zone wherein the resulting ammoniacal oxygen solution is contacted with the catalyst, and maintaining said water at a temperature of at least 100° C. and at an absolute pressure at least 40 pounds per square inch throughout said system thereby forming an aqueous ammoniacal solution of ammonium metavanadate, expelling ammonia from said solution, filtering the resulting ammonium metavanadate solution to separate undissolved impurities, and utilizing the solution thus purified for preparation of fresh vanadium oxide catalyst.

16. The method of dissolving vanadium from a vanadium oxide mixture, which comprises contacting the vanadium oxide mixture with a hot aqueous ammoniacal solution and oxygen under an absolute oxygen pressure of at least 10 pounds per square inch.

WILLIAM CHARLES COOPER, Jr.
ALVER DUNBAR.